(12) United States Patent
Paulucci

(10) Patent No.: US 6,312,744 B1
(45) Date of Patent: Nov. 6, 2001

(54) METHOD OF MICROWAVE HEATING A PRE-PACKAGED FROZEN ENTREE

(76) Inventor: Jeno Paulucci, 2020 Washington Dr., Sanford, FL (US) 32771

( * ) Notice: Subject to any disclaimer, the term of this patent is extended or adjusted under 35 U.S.C. 154(b) by 0 days.

(21) Appl. No.: 08/368,897

(22) Filed: Jan. 5, 1995

(51) Int. Cl.$^7$ ........................................................ C12H 1/06

(52) U.S. Cl. ................................................................ 426/234

(58) Field of Search ..................................... 426/107, 113, 426/120, 234, 243

(56) References Cited

U.S. PATENT DOCUMENTS

| | | | | |
|---|---|---|---|---|
| 2,768,086 | * | 10/1956 | Bliley | 426/557 |
| 2,801,930 | * | 8/1957 | Paulucci | 426/615 |
| 3,573,067 | * | 3/1971 | Shultz | 426/234 |
| 5,075,119 | * | 12/1991 | Mendenhall | 426/113 |
| 5,077,066 | * | 12/1991 | Mattson et al. | 426/234 |

OTHER PUBLICATIONS

Marie Callender's product package, distributed by MC Retail Foods© 1994.

* cited by examiner

*Primary Examiner*—Curtis Sherrer

(57) ABSTRACT

A process for microwave heating a pre-packaged frozen entree so that the heated pre-packaged frozen entree exhibits improved taste or appearance characteristics. The process includes providing the pre-packaged frozen entree in a container. The frozen entree has at least two food components. Each of the food components is discretely and loosely frozen. One of the food components is removed from the container. The food components that remain in the container are heated with microwave radiation for a first selected time interval. The food components are replaced into the container and another one of the food components is removed from the container. The food components that remain in the container are heated with microwave radiation for a second selected time interval. Each of the components is heated to a selected degree so that each of the food components does not experience a decrease in taste or appearance characteristics that would result from over-heating.

4 Claims, No Drawings

METHOD OF MICROWAVE HEATING A PRE-PACKAGED FROZEN ENTREE

BACKGROUND OF THE INVENTION

The present invention relates to a method of heating a re-packaged frozen entree with microwave radiation. More particularly, the present invention relates to a process for heating a pre-packaged frozen entree with microwave radiation so that the heated entree exhibits improved taste and/or appearance characteristics.

Prepared foods that allow consumers to decrease the time and effort needed to prepare meals are popular with consumers. These prepared foods commonly include multiple components, such as meat, vegetable, pasta rice, or sauce, that are packaged in a single container.

Even though the prepared foods enable consumers to avoid much of the preparation time associated with home-cooked foods, consumers expect prepared foods to exhibit taste and appearance characteristics that are similar to home-cooked foods. A prior art frozen entree includes three boil-in bags in which the vegetable, pasta, and sauce food components are individually packaged. The boil-in bags containing the vegetable and pasta food components are heated with microwave radiation for a first time interval. Then, the boil-in bags containing the vegetable, pasta, and sauce food components are heated with microwave radiation for a second time interval.

SUMMARY OF THE INVENTION

The present invention includes a process for microwave heating a pre-packaged frozen entree. As a result of the process of the present invention, the pre-packaged frozen entree exhibits improved taste and/or appearance characteristics after heating. The process includes the step of providing the pre-packaged frozen entree in a container. The frozen entree has at least two food components. Each of the food components is discretely and loosely frozen in the container.

One of the food components is removed from the container. The food components that remain in the container are heated with microwave radiation for a first selected time interval. The food component is placed back into the container and another one of the food components is removed from the container. The food components that remain in the container are heated with microwave radiation for a second selected time interval. Each of the food components is heated to a selected degree so that each of the food components does not experience a decrease in taste or appearance characteristics that would result from over-heating.

DETAILED DESCRIPTION OF THE PREFERRED EMBODIMENTS

The present invention includes a process for heating a pre-packaged frozen entree with microwave radiation. When the frozen entree is heated according to the process of the present invention, the taste and/or appearance characteristics of the heated entree are improved when compared to prior art frozen entrees.

The frozen entree used in conjunction with the process of the present invention includes at least two food components that are packaged in a container. The food components are selected based upon the type of entree that is to be prepared. For example, the food components may be selected to create oriental or italian style entrees.

The process of the present invention is particularly suited for use when the taste or appearance of the food components varies based upon the extent to which the food component is heated or cooked. For example, when a starch source such as rice or pasta is under-heated, the starch source tastes crunchy and appears rigid. Further, when the starch source is over-heated, the starch source becomes soggy or mushy. Both under-heating and over heating result in an entree that is undesirable to consumers.

Similar undesirable characteristics are seen with vegetables and meats. Vegetables are too crisp when under-heated and become mushy when over-heated. With meat, insufficient heating may not kill potentially harmful organisms in the meat and over-heating causes the meat to become dried-out or tough.

When several food components, such as starch, vegetable, and sauce, are contained in an entree, it becomes difficult to ensure that each of the food components is not under-heated or over-heated. Heating food components to a desired degree so that the food components exhibit desirable taste or appearance characteristics is further complicated by food components that take varying lengths of time to thaw.

The container, which is preferably used with the process of the present invention, contains a base and a plurality of side walls that extend from the base. The container is preferably sealed with a lid to retain the food components in the container prior to consumption.

The container also preferably includes a divider that is affixed to the base of the container and separates the food components. The divider maintains food components in separate portions of the container during shipment and thereby enables the consumer to more easily remove the food components during the heating process.

Each of the food components is discretely and loosely frozen in the container. The term "discretely" means the food components are not frozen intermixed in the container but are frozen as individual units. The term "loosely" means the food components are not packaged in separate bags or pouches and are generally unconfined except for the walls and divider of the container. Because the food components are not intermixed, the food components can be selectively removed from the container during the heating process. The discrete and loose placement of the food components in the container also allows the food components to be readily mixed together after the entree is heated.

The pre-packaged frozen entree includes a starch portion, a vegetable portion, and a sauce portion. Preferably, the starch portion is rice, the vegetable portion is a mixture of broccoli and red bell peppers, and the sauce portion is an oriental-style sauce that contains pieces of beef. The entree is prepared by discretely and loosely packaging 6.47 ounces of rice, 3.11 ounces of the mixture of broccoli and red bell peppers, and 6.22 ounces of the oriental-style sauce in the container.

In one embodiment of the method of the present invention, the rice, broccoli, red bell peppers, and oriental-style sauce are heated with microwave radiation for a first selected time period. When using a microwave oven on a high power level setting, the first selected time period is approximately 6 minutes. The mixture of broccoli and red bell peppers is removed from the container and the rice and the oriental-style sauce are heated for a second selected time period. When using a microwave oven on a high power level setting, the second selected time period is approximately 5 to 6 minutes.

The mixture of broccoli and red bell peppers is mixed with the oriental-style sauce and then placed over rice for consumption. The process of the present invention causes each of the food components to be heated to a desirable temperature for consumption while enabling the broccoli to remain crisp. In addition, the process of the present invention does not cause the red bell peppers or the rice to become soggy or mushy from over-heating.

In another preferred embodiment of the present invention, the mixture of broccoli and red bell peppers is removed from the container. The rice and oriental-style sauce are heated with microwave radiation for a first selected time period. When using a microwave oven on a high power level setting, the first selected time period is approximately 7 minutes.

The rice is then removed from the container and the mixture of broccoli and red bell peppers is placed back into the container. The broccoli, red bell peppers, and oriental-style sauce are heated with microwave radiation for a second selected time period. When using a microwave oven on a high power level setting, the second selected time period is approximately 3 minutes.

The mixture of broccoli and red bell peppers is mixed with the oriental-style sauce and then placed over the rice for consumption. The process of the present invention causes each of the food components to be heated to a desirable temperature for consumption while enabling the broccoli to remain crisp. In addition, the process of the present invention does not cause the red bell peppers or the rice to become soggy or mushy from over-heating.

It has surprisingly been found that reducing the number of food components that are simultaneously heated and modifying the order in which the food components are heated allows the entree heating time to be reduced. With the preferred embodiment, the total cooking time is 10 minutes and only two of the food components are heated in each of the selected time intervals.

The following examples are presented to illustrate combinations of food components that have been used in conjunction with the process of the present invention. These examples are not intended to limit the scope of the present invention.

EXAMPLE 1

A beef and broccoli entree weighing 16 ounces was prepared from a sauce mixture containing beef, a vegetable mixture, and rice. The sauce mixture, the vegetable mixture, and the rice were placed in a container with the following concentrations:

| Ingredients | Percent by Weight |
| --- | --- |
| Sauce Mixture | 38.89 |
| Vegetable Mixture | 19.44 |
| Rice | 41.67 |

After the beef and broccoli entree was frozen to a temperature of between approximately −10° C. and 0° C., the entree was heated using the method of the present invention. The vegetable mixture was removed from the container. The sauce mixture and the rice were heated in a microwave oven that was on a high power level setting for 7 minutes. The rice was removed from the container and the vegetable mixture was placed back into the container. The sauce mixture and the vegetable mixture were heated in a microwave oven that was on a high power level setting for 3 minutes. The process of the present invention caused the beef and broccoli entree to be heated to a desirable consumption temperature, while the vegetable mixture remained crisp and the rice did not become soggy or mushy.

EXAMPLE 2

A sweet and sour chicken entree weighing 17 ounces was prepared from a sauce mixture containing chicken, a vegetable mixture, and rice. The sauce mixture, the vegetable mixture, and the rice were placed in a container with the following concentrations:

| Ingredients | Percent by Weight |
| --- | --- |
| Sauce Mixture | 37.50 |
| Vegetable Mixture | 20.83 |
| Rice | 41.67 |

The sweet and sour chicken entree was processed following the conditions set forth in Example 1. The process of the present Invention caused the sweet and sour chicken entree to be heated to a desirable consumption temperature, while the vegetable mixture remained crisp and the rice did not become soggy or mushy.

EXAMPLE 3

A pork lo mein entree weighing 17 ounces was prepared from a sauce mixture containing pork, a vegetable mixture, and linguini. The sauce mixture, the vegetable mixture, and the linguini were placed in a container with the following concentrations:

| Ingredients | Percent by Weight |
| --- | --- |
| Sauce Mixture | 38.89 |
| Vegetable Mixture | 22.22 |
| Linguini | 38.89 |

The pork lo mein entree was processed following the conditions set forth in Example 1. The process of the present invention caused the pork lo mein entree to be heated to a desirable consumption temperature, while the vegetable mixture remained crisp and the linguini did not become soggy or mushy.

EXAMPLE 4

A cashew chicken entree weighing 16 ounces was prepared from a sauce mixture containing chicken, a vegetable mixture, and a rice and cashew mixture. The sauce mixture, the vegetable mixture, and the rice and cashew mixture were placed in a container with the following concentrations:

| Ingredients | Percent by Weight |
| --- | --- |
| Sauce Mixture | 40.28 |
| Vegetable Mixture | 19.44 |
| Rice and Cashew Mixture | 40.28 |

The cashew chicken entree was processed following the conditions set forth in Example 1. The process of the present invention caused the cashew chicken entree to be heated to a desirable consumption temperature, while the vegetable mixture remained crisp and the rice did not become soggy or mushy.

EXAMPLE 5

A hunan chicken entree weighing 16 ounces was prepared from a sauce mixture containing chicken, a vegetable mixture, and rice. The sauce mixture, the vegetable mixture, and the rice were placed in a container with the following concentrations:

| Ingredients | Percent by Weight |
| --- | --- |
| Sauce Mixture | 38.89 |
| Vegetable Mixture | 20.83 |
| Rice | 40.28 |

The hunan chicken entree was processed following the conditions set forth in Example 1. The process of the present invention caused the hunan chicken entree to be heated to a desirable consumption temperature, while the vegetable mixture remained crisp and the rice did not become soggy or mushy.

EXAMPLE 6

A garlic beef entree weighing 16 ounces was prepared from a sauce mixture containing beef, a vegetable mixture, and rice. The sauce mixture, the vegetable mixture, and the rice were placed in a container with the following concentrations:

| Ingredients | Percent by Weight |
| --- | --- |
| Sauce Mixture | 40.28 |
| Vegetable Mixture | 19.44 |
| Rice | 40.28 |

The garlic beef entree was processed following the conditions set forth in Example 1. The process of the present invention caused the garlic beef entree to be heated to a desirable consumption temperature, while the vegetable mixture remained crisp and the rice did not become soggy or mushy.

EXAMPLE 7

A szechwan pork entree weighing 16 ounces was prepared from a sauce mixture containing pork, a vegetable mixture, and a pasta and rice mixture. The sauce mixture, the vegetable mixture, and the pasta and rice mixture were placed in a container with the following concentrations:

| Ingredients | Percent by Weight |
| --- | --- |
| Sauce Mixture | 38.89 |
| Vegetable Mixture | 19.44 |
| Pasta and Rice Mixture | 41.67 |

The szechwan pork entree was processed following the conditions set forth in Example 1. The process of the present invention caused the szechwan pork entree to be heated to a desirable consumption temperature, while the vegetable mixture remained crisp and the pasta and rice mixture did not become soggy or mushy.

EXAMPLE 8

A teriyaki chicken entree weighing 16 ounces was prepared from a sauce mixture containing chicken, a vegetable mixture, and rice. The sauce mixture, the vegetable mixture, and the rice were placed in a container with the following concentrations:

| Ingredients | Percent by Weight |
| --- | --- |
| Sauce Mixture | 41.89 |
| Vegetable Mixture | 18.94 |
| Rice | 39.17 |

The teriyaki chicken entree was processed following the conditions set forth in Example 1. The process of the present invention caused the teriyaki chicken entree to be heated to a desirable consumption temperature, while the vegetable mixture remained crisp and the rice did not become soggy or mushy.

Although the present invention has been described with reference to preferred embodiments, workers skilled in the art will recognize that changes may be made in form and detail without departing from the spirit and scope of the invention.

What is claimed is:

1. A process for microwave heating a pre-packaged frozen entree, the pre-packaged frozen entree exhibiting improved taste or appearance characteristics after heating, the process comprising:

providing the pre-packaged frozen entree in a container, the frozen entree having a sauce component, a vegetable component, and a starch component, each component being discretely and loosely frozen;

removing the vegetable component from the container;

heating the sauce component and the starch component with microwave radiation for a first selected time interval;

removing the starch component from the container;

placing the vegetable component back into the container; and heating the sauce component and the vegetable component with microwave radiation for a second selected time interval, wherein each of the components is heated to a selected degree so that each of the components does not experience a decrease in taste or appearance characteristics that would result from over-heating.

2. A process for microwave heating a frozen meal, the frozen meal exhibiting improved taste or appearance characteristics after heating, the process comprising:

providing the frozen meal in a container, the frozen meal having at least two food components, each food component being discretely and loosely frozen;

removing one of the food components from the container;

heating the food components that remain in the container with microwave radiation for a first selected time interval;

replacing the food component into the container;

removing another one of the food components from the container; and heating the food components that remain in the container with microwave radiation for a second selected time interval, wherein each of the components is heated to a selected degree so that each of the food components does not experience a decrease in taste or appearance characteristics that result from over-heating.

3. A process for microwave heating a pre-packaged frozen entree, the pre-packaged frozen entree exhibiting improved taste or appearance characteristics after heating, the process comprising:

providing the pre-packaged frozen entree in a container, the frozen entree having a sauce component, a vegetable component, and a starch component, each component being discretely and loosely frozen;

heating the sauce component, the vegetable component, and the starch component with microwave radiation for a first selected time interval;

removing the vegetable component from the container; and heating the sauce component and the starch component with microwave radiation for a second selected time interval, wherein each of the components is heated to a selected degree so that each of the components does not experience a decrease in taste or appearance characteristics that would result from over-heating.

4. A process for microwave heating a pre-packaged, frozen entree, the pre-packaged frozen entree exhibiting improved taste or appearance characteristics after heating, the process comprising:

providing the pre-packaged frozen entree in a container, the frozen entree having at least two food components, each food component being discretely and loosely frozen;

heating the food components with microwave radiation for a first selected time interval;

removing one of the food components from the container; and heating the food components that remain in the container with microwave radiation for a second selected time interval, wherein each of the food components is heated to a selected degree so that each of the food components does not experience a decrease in taste or appearance characteristics that would result from over-heating.

* * * * *